(12) United States Patent
Oliver et al.

(10) Patent No.: US 8,712,602 B1
(45) Date of Patent: Apr. 29, 2014

(54) MOBILE TARGET SYSTEM

(76) Inventors: Timothy S. Oliver, Columbia, MO (US); Michael F. Holloway, Holts Summit, MO (US)

( * ) Notice: Subject to any disclaimer, the term of this patent is extended or adjusted under 35 U.S.C. 154(b) by 168 days.

(21) Appl. No.: 13/479,943

(22) Filed: May 24, 2012

Related U.S. Application Data (60) Provisional application No. 61/489,562, filed on May 24, 2011.

(51) Int. Cl.
*G05D 1/00* (2006.01)
*G05D 3/00* (2006.01)

(52) U.S. Cl.
USPC ............................. 701/2; 701/1; 701/24

(58) Field of Classification Search
USPC ........... 701/1, 2, 24; 340/12.22, 12.23, 12.28, 340/12.51, 12.53; 345/158, 169; 375/233, 375/261, 285, 296, 350
See application file for complete search history.

(56) References Cited

U.S. PATENT DOCUMENTS

| | | | |
|---|---|---|---|
| 4,621,562 A * | 11/1986 | Carr et al. ............... | 89/41.05 |
| 4,641,251 A | 2/1987 | Inoue | |
| 4,993,912 A * | 2/1991 | King et al. ............... | 414/729 |
| 5,845,540 A | 12/1998 | Rosheim | |
| 5,967,580 A | 10/1999 | Rosheim | |
| 6,016,385 A | 1/2000 | Yee et al. | |
| 6,113,343 A | 9/2000 | Goldenberg et al. | |
| 6,332,372 B1 | 12/2001 | Takenaka et al. | |
| 6,507,773 B2 | 1/2003 | Parker et al. | |
| 6,901,313 B2 | 5/2005 | Mori et al. | |
| 7,152,050 B2 | 12/2006 | Aoyama et al. | |
| 7,469,902 B1 | 12/2008 | Hale | |
| 2004/0030571 A1 | 2/2004 | Solomon | |
| 2004/0248633 A1 | 12/2004 | Trawick et al. | |
| 2007/0105070 A1 | 5/2007 | Trawick | |
| 2010/0030378 A1 * | 2/2010 | Choi et al. ............... | 700/245 |
| 2011/0045445 A1 | 2/2011 | Spychalski | |
| 2011/0089639 A1 | 4/2011 | Bellamy et al. | |

* cited by examiner

*Primary Examiner* — Ian Jen
(74) *Attorney, Agent, or Firm* — Grace J. Fishel (57) ABSTRACT

A remote controlled mobile target system having a target base on wheels and a target rotatable on the base under wireless control of a central processing unit. The target is rotatable between a shoot and no-shoot position independent of movement of the target base thereby giving a student a better simulation of real close quarters firearms engagement. The movements of the target base and target may be programmed or under the control of an instructor and when programmed the movements may be randomized based on number of hits to the target or hits to a specific hit sensitive area of the target.

17 Claims, 7 Drawing Sheets

MOBILE TARGET SYSTEM

This application claims priority from provisional application Ser. No. 61/489,562, filed May 24, 2011, for Mobile Target System.

BACKGROUND OF THE INVENTION

1. Field of the Invention

The present invention relates to a target and a target base under remote control, said target being selectively rotatable on the target base separate from movement of the target base.

2. Brief Description of the Prior Art

Firearms training for civilians, law enforcement officers and military personnel has relied on rudimentary moving and static targets. Although shoot, no shoot target systems have been around for years, there was no sense of real dynamic movement. The targets were affixed to a carriage and confined to an area and the target was unable to move in any other direction than the predetermined one. This shortcoming is resolved with embodiments of the mobile target system described below wherein specific embodiment can cover a Tueller drill with a pistol in 1.5 seconds or faster and turn from a shoot target to a no-shoot in well under a second. In addition, another problem with firearms training has been that the targets do not shoot back.

BRIEF SUMMARY OF THE INVENTION

In view of the above, it is an object of the present invention to provide a dynamic moving target to better simulate lifelike movements and give a student a better simulation of real close quarters firearms engagement. Another object is to provide a mobile target system with a moveable target base upon which is mounted a rotatable target with movement of the target base and movement of the target being separately remotely controlled by an operator or preprogrammed. Other objects and features of the invention will be in part apparent and in part pointed out hereinafter.

In accordance with the invention, a mobile target system includes a moveable target base that is remotely controlled by an operator or programmed to follow a predetermined course. The system also includes a target that is selectively rotatable on the moveable target base. Movement of the target is remotely controlled by the operator or can be preprogrammed.

The invention summarized above comprises the constructions hereinafter described.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Referring to the drawings more particularly by reference number, reference numerals 10, 10' refer to a remotely controlled mobile target system including a rotatable target 12, 12' on a movable target base 14.

Figure 6:
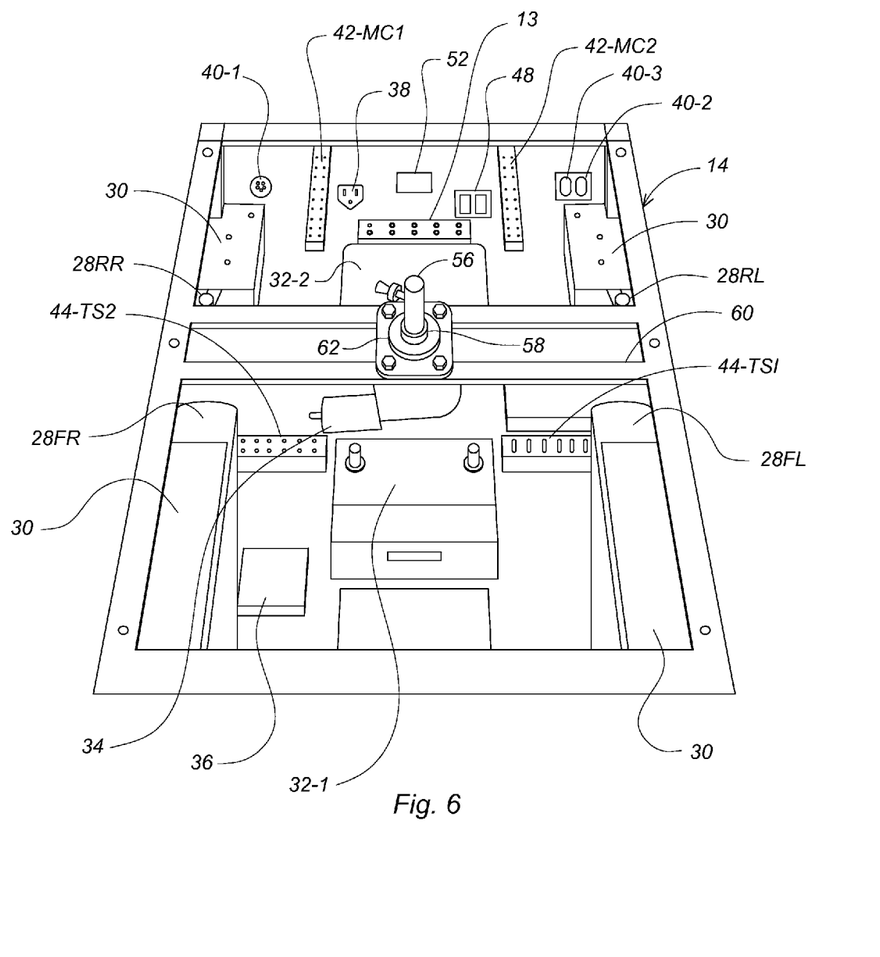
FIG. 6 is plan perspective view of the target base with a top panel removed.

Movable target base 14 includes a framework 16 which is shielded with front 18, rear 20, top 22 and side panels 24 formed of plate resistant to bullet impacts such as 3/16" mild steel or ballistic steel. Base 14 is supported on wheels 26. In the form illustrated, there are two forward wheels 26FL and 26FR and two rear wheels 26RL and 26RR independently journaled for rotation on hubs (not shown). In other models, rear wheels 26RL and 26RR (or the front wheels) may be replaced with a single caster or with casters (not shown). As shown in FIG. 6, the hubs of wheels 26 are keyed to four electric motors 28, e.g., half horsepower DC electric motors 28FL, 28FR, 28RL and 28RR. Motor mounts 30 are provided in framework 16 for supporting motors 28.

Figure 1:
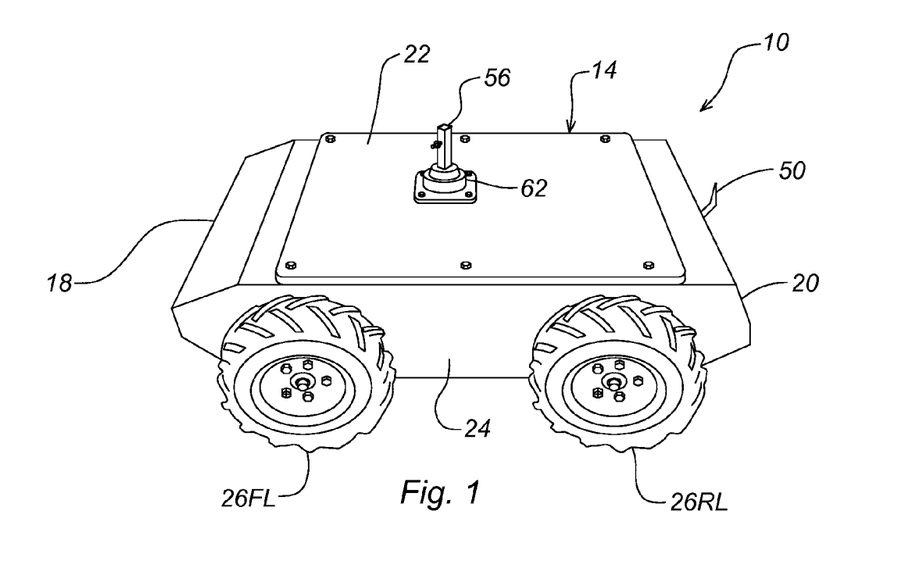
FIG. 1 is side perspective view of a movable target base.
Figure 2:
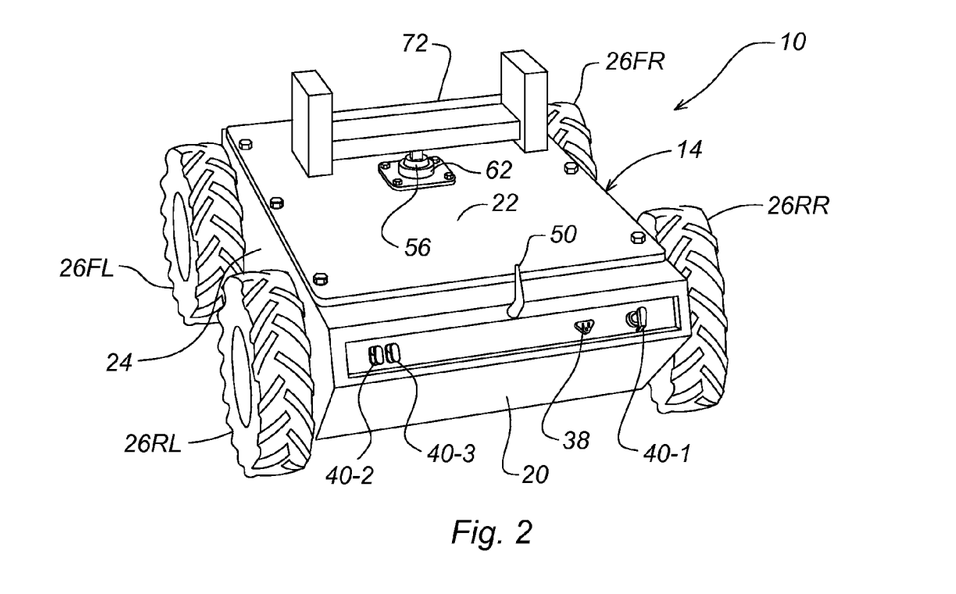
FIG. 2 is rear perspective view thereof.
Figure 8:
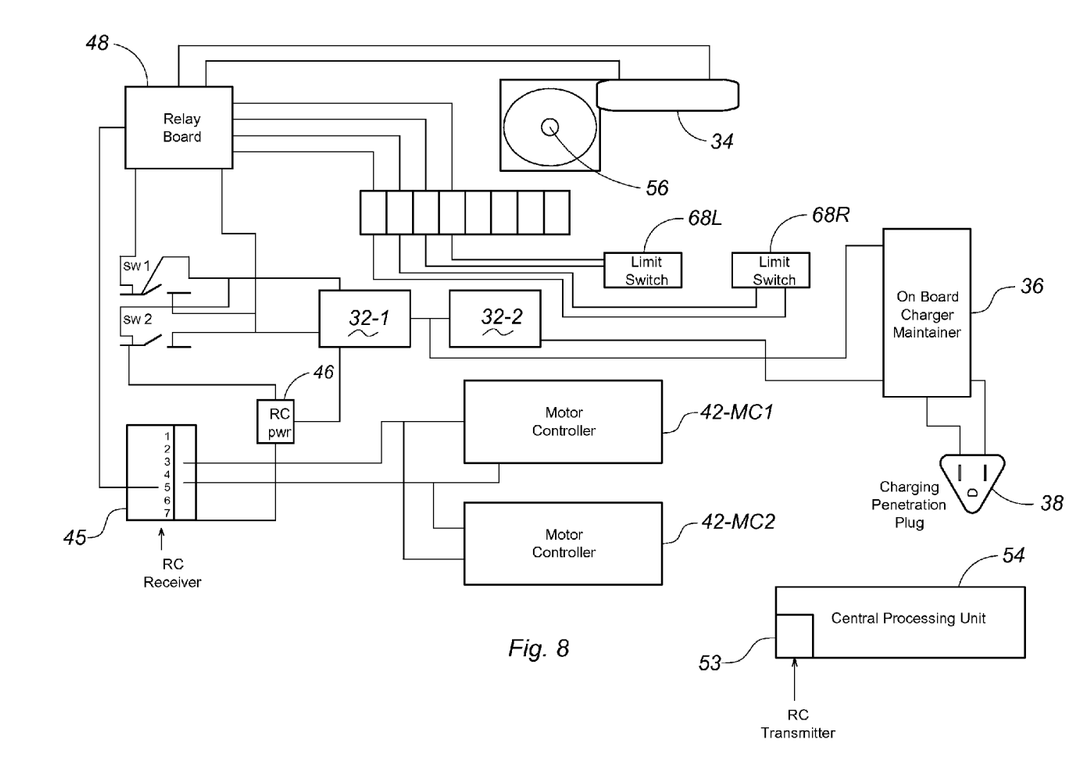
FIG. 8 is a block diagram showing a mechanism for controlling rotation of the target; and, FIG. 9 is a block diagram showing a mechanism for controlling movement of the target base.
Figure 9:
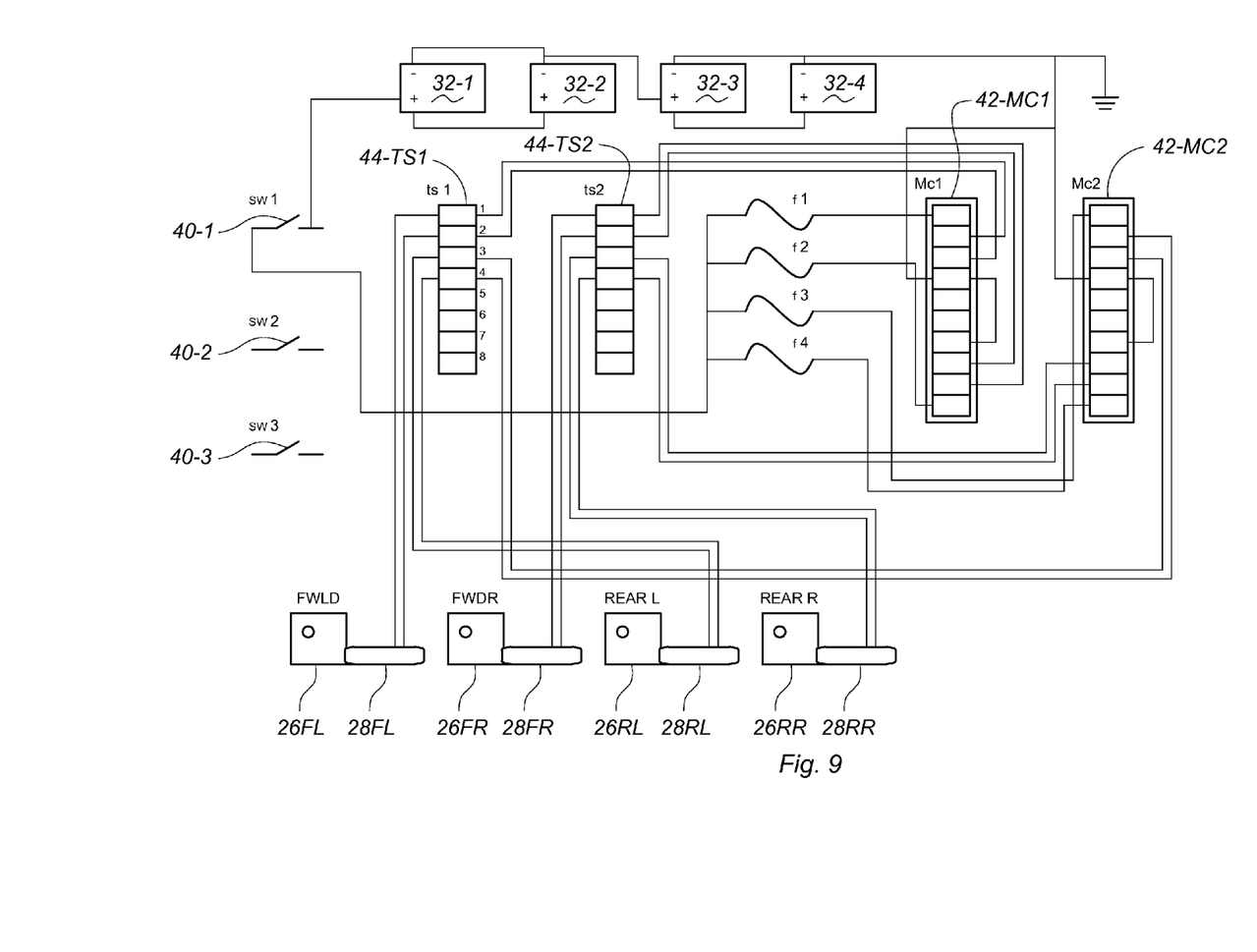

Movable target system 10, 10' is powered with batteries 32 such as battery 32-1 and battery 32-2 as illustrated in FIGS. 6 and 8 and batteries 32-1 through 32-4 in FIG. 9. The circuit shown in FIG. 8 connects batteries 32 to motors 28 for powering the wheels 26 and to another motor 34 for powering target 12, 12'. The circuit also includes an onboard charger maintainer 36 for recharging batteries 32. It will be understood that more batteries as shown in FIG. 9 or just one battery may be used depending on battery storage capacity and desired run time between recharging. Depending on operational requirements, movable target system 10, 10' can be configured to operate on 12 vDC or 24 vDC. On rear panel 20 a plug 38 (FIGS. 2, 8) such as a three prong AC penetrative plug is provided for use in plugging movable target system 10, 10' into a standard 110 vAC power source. As seen in FIG. 9, batteries 32 are linked in series. Onboard charger maintainer 36 has two leads, one going to the positive pole of the first battery in series and the other lead to the negative pole of the second or last battery in series. Switch 40-1, switch 40-2 and switch 40-3 as more particularly described below are also provided on rear panel 20.

Switch 40-1 as seen in FIG. 9, is a master switch for use in closing the circuit connecting batteries 32 and motors 28 for wheels 26 and motor 34 for target 12. For use in modulating the power provided to the wheels, a first motion control processor 42-MC1 to front wheels 26FL and 26FR and a second motion control processor 42-MC2 is provided for modulating the power provided to rear wheels 26RL and 26RR through first and second terminal strips 44-TS1 and 44-TS2. Motion control processors 42-MC1 and 42-MC2 use pulse width modulation to provide steering and speed control to motors 28. Switch 40-2 provides power to an RC receiver 45 through a voltage reducer 46 and switch 40-3 provides power to a relay board 48 acting as a third motion control processor. Relay board 48 has circuitry for reversing the polarity of the leads connected to motors 28 for wheels 28 and motor 35 for target 12, 12'. Hence, wheels 26 may be differentially driven for use in steering target base 14. For example, to turn movable target base 14 to the right, the left motors 28FL and 28RL propel the base forward, and the right motors 28RL and 28RR either propel in reverse or stop, depending the command received by radio control receiver 45 which is shown in FIG. 8. This allows target base 14 to spin on axis or turn while in movement. As shown in FIGS. 1-4, an antenna 50 is provided on rear panel 20 which is connected to receiver 45 through a receiver and antenna adapter 52 provided on the inside of rear panel 20. Signals to receiver 45 are provided by a radio control transmitter 53 under control of a central processing unit 54 (FIG. 8) as more particularly described below.

Figure 3:
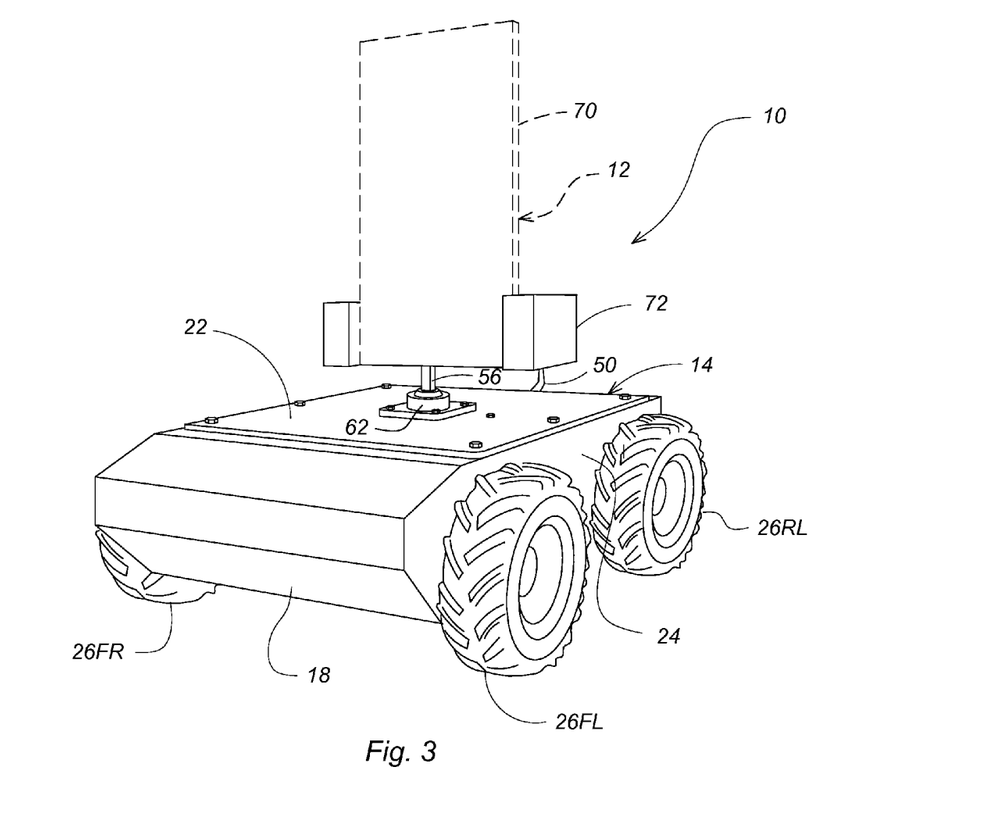
FIG. 3 is a front perspective view thereof showing a first rotatable target on the target base.
Figure 7:
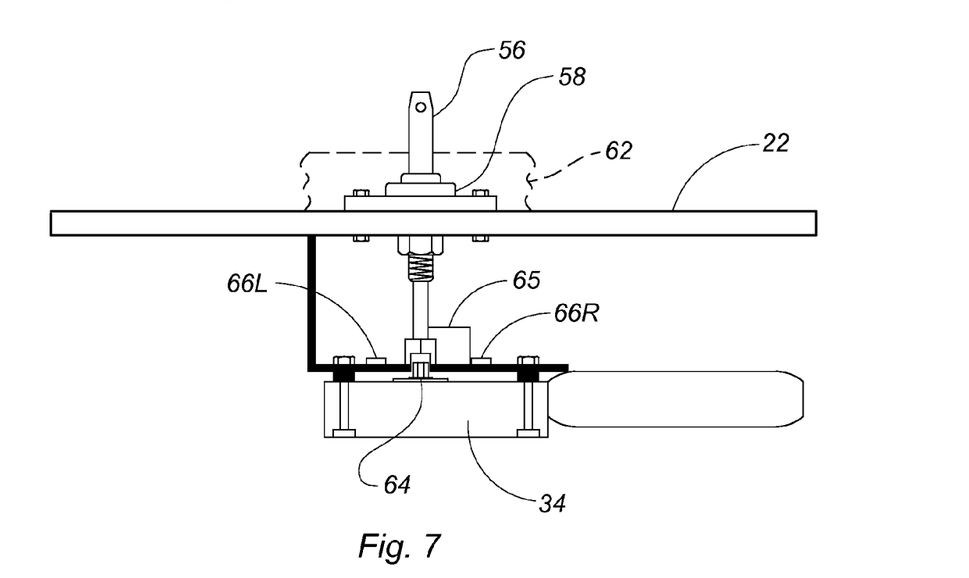
FIG. 7 is side elevation of the rotatable target support.

Target 12 as been seen in FIGS. 3 and 7 includes a target support with a shaft 56 passing through an aperture provided in top panel 22 of target base 14. Target 12 is designed to spin on axis in either direction under control of central processing unit 54. This allows a target 12 (FIG. 3) to be presented to a shoot and no-shoot position for the purpose of simulating a firefight situation. For this purpose, shaft 56 is journaled in a bearing 58 which is supported on crossmembers 60 of framework 16. A protective boot 62 may be provided over bearing 58 and the aperture. As shown in FIG. 7, shaft 56 is keyed to a drive shaft 64 of motor 34. Through relay board 48 (third motion control processor) motor 34 is under control of central processing unit 54. The RC receiver 45 used in a prototype of mobile target system 10, 10' was a 2.4 ghz frequency hopping 6 channel receiver and central processing unit 54 was a 2.4 ghz dual stick 5 channel radio controller, selected for possible expansion in later models. A shaft stop 65 may be attached to shaft 56 for contact with right and left limit switch mounts 66R, 66L bearing limit switches 68R, 68L (FIG. 8). Limit switches 68R, 68L are in circuit with relay board discussed above. A paper or cardboard target 70 is mounted in a frame 72 provided on shaft 56. While a particular frame 72 is shown in the drawings it will be understood that other arrangements may be provided for other types of targets. Typically frame 72 is used with paper or cardboard practice targets 70 which have a buff colored shoot side and a white no-shoot side.

Through the circuitry shown in FIG. 8, an instructor may rotate shaft 56 until stopped by one of limit switches 68R, 68L. Once the rotation is stopped in one direction relay board 48 allows the turning mechanism to spin shaft 56 in the opposite direction. This same function may be provided with a servo motor under control of RC receiver 45 with limit switch mounts 66R, 66L and limit switches 68R, 68L omitted.

Figure 4:
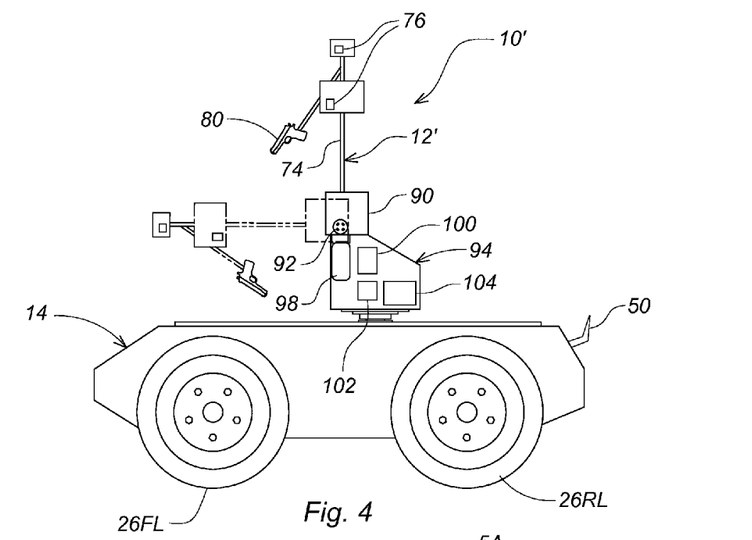
FIG. 4 is a side elevation of a second rotatable target on the target base.
Figure 5:
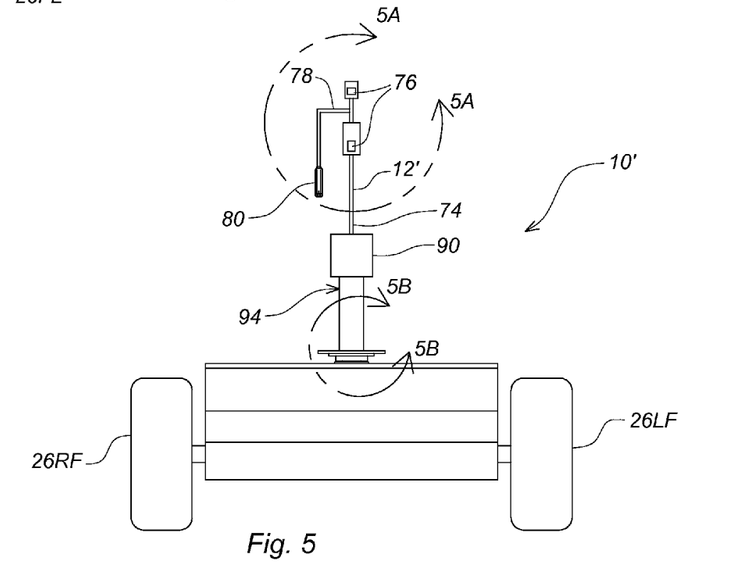
FIG. 5 is a front elevation of the second rotatable target on the target base.
Figure 5A:
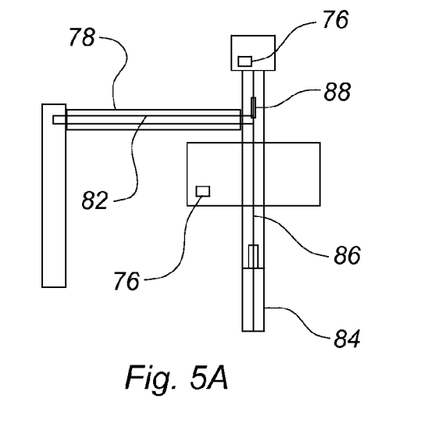
FIG. 5A is a detail taken along line 5A-5A in FIG. 5 of the second rotatable target.
Figure 5B:
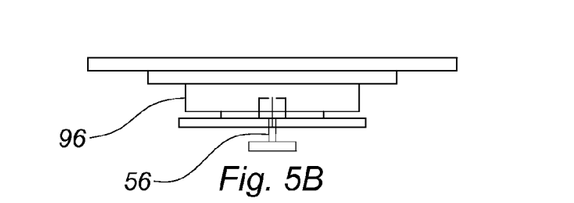
FIG. 5B is a detail taken along line 5B-5B in FIG. 5 of the second rotatable target.

A second embodiment of mobile target system 10' is shown in FIGS. 4 and 5. In this instance, target 12' has human-like appearance and movements. In simplified form, target 12' includes a support 74 with two hit sensing reactive targets 76. For example, hit sensing reactive targets 76 may have a 360 degree sensor area at chest and at head height to emulate the A zones of a human (which is what is used in law enforcement and the military as the areas the student is trained to target). The lower A zone is a 6 by 6 inch area of the chest of a normal human and the upper A zone is a 4 by 4 inch area of the head. An arm 78 bearing an airsoft gun 80 or the like may be pivoted to target 12'. As shown in FIG. 5A, arm 78 is mounted on an axle shaft 82. A linkage including an electric actuator 84, linkage 86 and an actuator attach point 88 may be used to rotate arm 78 such that airsoft gun 80 may be raised and lowered. Support 74 is mounted on a foot 90 which is pivoted about an axle 92 (FIG. 4) on target articulation unit 94. Target articulation unit 94 is in turn mounted on a carrousel 96 best seen in FIG. 5B which is rotated by shaft 56 of motor 34 as described above. In the form illustrated, target articulation unit 94 includes a motor 98 for pivoting foot 90, a fourth motion control processor 100 for the motor 98 and a fifth motion control processor 102 for the arm and airsoft gun operation. A battery 104 may also be provided for operation of target 12' separate from operation of the target base 14.

In use, target base 14 and targets 12, 12' may be operated separately, i.e., targets 12, 12' may rotate on target base 14 independent of movement of the target base 14. For example, upon one of A zone areas 76 being struck by a bullet, a sensor behind the A zone will send a signal to central processing unit 54 and target 12' may be rotated over parallel to the ground giving full visualization that the target has been struck by the bullet in the proper area. Control of electric actuator 84 to raise arm 78 and to cause gun 80 to shoot back may be under instructor control through a second remote control system like a key fob. Operation of target 12' through central processing unit 54 may also be under control of an instructor such that a student is pressed to the limit of his or her abilities in a training session but not beyond. Alternatively, central processing unit 54 may be programmed to control the rotation of target 12' not just in response to a specific number of hits or hits to a particular hit sensitive target area but for a random number of hits. This allows a student to train on mobile target system 10' and not know how many hits may be needed to rotate the target into no-shoot position Like targets 12, 12' but separate therefrom, movement of target base 14 may be under control of an instructor or programmed to run an autonomous predetermined route separate.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limited sense.

What is claimed:

1. A remote controlled mobile target system comprising:
   a wireless receiver for receiving signals from a central processing unit,
   a target base to which the receiver is mounted, said base mounted on wheels, said wheels connected to motors causing rotation of the wheels, said motors under control of the central processing unit and each motor operating independently of the others to allow each wheel to be locked or move in a forward or rearward direction,
   a target mounted for rotation on the base, a motor causing rotation of the target, said motor under control of the central processing unit, said target rotatable into shoot and do not shoot position independent of movement of the target base.

2. The remote controlled mobile target system of claim 1 wherein motion control processors are provided on the base for each motor, said motion control processors communicating with the central processing unit through the wireless receiver.

3. The remote controlled mobile target system of claim 2 wherein the motion control processors receive instructions entered by an operator into the central processing unit or from an application program provided in the central processing unit.

4. The remote controlled mobile target system of claim 2 wherein the motion control processors use pulse width modulation to provide steering and speed control to the motors driving the wheels.

5. The remote controlled mobile target system of claim 4 wherein a relay with circuitry for reversing the polarity of leads is connected to the motors for the wheels and the motor for the target.

6. A remote controlled mobile target system comprising:
a wireless receiver for receiving radio frequency control signals from a central processing unit,
a target base to which the receiver is mounted, said base mounted on four rotatable wheels, said wheels connected to motors causing rotation of the wheels, said motors under control of the central processing unit and each operating independently of the others such that each wheel can be locked or move in a forward or rearward direct,
a target including a frame for attachment of a cardboard sheet having a colored shoot side and a white no-shoot side, said target connected to a motor causing rotation of the target and cardboard sheet between a shoot and do not shoot position independent of movement of the target base.

7. The remote controlled mobile target system of claim 6 wherein movements of the target base and target through the central processing unit are under control of an instructor.

8. The remote controlled mobile target system of claim 6 wherein the central processing unit is programmed to control movements of the target base and target.

9. The remote controlled target system of claim 6 wherein limit switches are provided on the base to stop rotation of target by the motor between preestablished limits.

10. The remote controlled target system of claim 6 wherein the motor for rotating the target is a servo motor that limits rotation of the target by the motor between preestablished limits.

11. A remote controlled mobile target system comprising:
a wireless receiver for receiving radio frequency control signals from a central processing unit,
a target base to which the receiver is mounted, said base mounted on four rotatable wheels, said wheels connected to motors causing rotation of the wheels, said motors under control of the central processing unit and each operating independently of the others such that each wheel can be locked or move in a forward or rearward direct,
a target having human appearance including a first hit sensing reactive target area at chest height and a second hit sensing reactive target area at head height, said target connected to a motor causing rotation of the target independent of movement of the target base.

12. The remote controlled mobile target system of claim 11 wherein the target includes an arm with an airsoft gun, said arm rotatable between a raised and lowered position by an electric actuator, firing of the airsoft gun and rotation of the arm being under wireless control of a wireless transmitter.

13. The remote controlled mobile target system of claim 11 wherein the target is mounted on a target articulation unit which is mounted for rotation on the base, said target being mounted on a foot, said foot rotatable on the target articulation unit such that the target moves between upright position and parallel to the ground, a motor causing rotation of the foot, said motor under control of the central processing unit.

14. The remote controlled mobile target system of claim 11 wherein the central processing unit is under control of an instructor.

15. The remote controlled mobile target system of claim 11 wherein the central processing unit is programmed to control movements of the target based on the number of hits to the hit sensitive sensitive target areas.

16. The remote controlled mobile target system of claim 11 wherein the central processing unit is programmed such that rotation of the target between upright position and parallel to the ground in response to hits to the hit sensitive target areas is randomized.

17. The remote controlled target system of claim 11 wherein motion control processors are provided on the target base and on the target articulation unit for each motor, said motion control processors communicating with the central processing unit through the wireless receiver.

\* \* \* \* \*